US012628167B2

(12) United States Patent
Baek et al.

(10) Patent No.: US 12,628,167 B2
(45) Date of Patent: May 12, 2026

(54) METHOD AND APPARATUS FOR APPLYING LOGICAL CHANNEL LIMIT IN WIRELESS COMMUNICATION SYSTEM

(71) Applicant: Samsung Electronics Co., Ltd., Gyeonggi-do (KR)

(72) Inventors: Sangkyu Baek, Gyeonggi-do (KR); Soenghun Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 250 days.

(21) Appl. No.: 17/777,483

(22) PCT Filed: Nov. 13, 2020

(86) PCT No.: PCT/KR2020/015982
§ 371 (c)(1),
(2) Date: May 17, 2022

(87) PCT Pub. No.: WO2021/101179
PCT Pub. Date: May 27, 2021

(65) Prior Publication Data
US 2022/0408430 A1      Dec. 22, 2022

(30) Foreign Application Priority Data

Nov. 18, 2019     (KR) ......................... 10-2019-0147999

(51) Int. Cl.
*H04W 72/21*      (2023.01)
*H04W 72/23*      (2023.01)
*H04W 72/56*      (2023.01)

(52) U.S. Cl.
CPC ........... *H04W 72/21* (2023.01); *H04W 72/23* (2023.01); *H04W 72/56* (2023.01)

(58) Field of Classification Search
None
See application file for complete search history.

(56) References Cited

U.S. PATENT DOCUMENTS 11,140,571 B2     10/2021  Baek et al.
11,395,309 B2 *    7/2022  Jiang ..................... H04W 72/21
(Continued)

FOREIGN PATENT DOCUMENTS

KR     10-2018-0108389     10/2018

OTHER PUBLICATIONS

PCT/ISA/210 Search Report issued on PCT/KR2020/015982, Feb. 18, 2021 pp. 5.
(Continued)

*Primary Examiner* — Luna Weissberger
(74) *Attorney, Agent, or Firm* — The Farell Law Firm, P.C.

(57)      ABSTRACT

The present disclosure relates to a communication technique for combining an IoT technology with a 5G communication system for supporting a higher data rate than a beyond 4G system, and a system therefor. The present disclosure can be applied to intelligent services (for example, smart homes, smart buildings, smart cities, smart cars or connected cars, health care, digital education, retail businesses, security and safety-related services, and the like) on the basis of 5G communication technologies and IoT-related technologies. Disclosed are a method and apparatus for applying or changing a logical channel limit in a wireless communication system.

8 Claims, 14 Drawing Sheets

(56) References Cited

U.S. PATENT DOCUMENTS

| 11,956,789 | B2 * | 4/2024 | Alfarhan | ............... | H04W 80/08 |
| 2015/0117368 | A1 * | 4/2015 | Barriac | ................ | H04W 72/02 |
| | | | | | 370/329 |
| 2019/0132862 | A1 | 5/2019 | Jeon et al. | | |
| 2021/0176696 | A1 * | 6/2021 | Sebire | ................... | H04W 48/12 |
| 2022/0104187 | A1 * | 3/2022 | Zhou | ................ | H04W 72/0446 |

OTHER PUBLICATIONS

PCT/ISA/237 Written Opinion issued on PCT/KR2020/015982, Feb. 18, 2021, pp. 4.

Ericsson, "Reliability aspects in LCP restriction enhancement", R2-1914753, 3GPP TSG RAN WG2 #108, Reno, USA, Nov. 7, 2019, pp. 6.

Ericsson, "On intra-UE prioritization enablers", R1-1906097, 3GPP TSG RAN WG1 Meeting #97, Reno, USA, May 4, 2019, pp. 13.

Huawei et al., "Discussion on mapping between LCH and CG configurations", R2-1914782, 3GPP TSG RAN WG2 #108, Reno, USA, Nov. 7, 2019, pp. 7.

LG Electronics, "Discussion on DL SPS enhancement and resource conflict between PUSCHs", R1-1908547, 3GPP TSG RAN WG1 #98, Prague, Czech Republic, Aug. 17, 2019, pp. 8.

3GPP TSG-RAN2 Meeting #108, R2-1915338, Reno, USA, Nov. 8, 2019, pp. 75.

Ericsson, "Reliability Aspects in LCP Restriction Enhancement", R2-1909374, 3GPP TSG-RAN WG2 #107, Aug. 26-30, 2019, 4 pages.

ASUSTeK, "Intra UE Prioritization for UL Grants", R2-1901039, 3GPP TSG-RAN WG2 Meeting #105, Feb. 25-Mar. 1, 2019, 3 pages.

European Search Report dated Sep. 27, 2022 issued in counterpart application No. 20891354.1-1215, 10 pages.

European Search Report dated May 31, 2024 issued in counterpart application No. 20891354.1-1215, 7 pages.

Korean Office Action dated Feb. 25, 2025 issued in counterpart application No. 10-2019-0147999, 9 pages.

* cited by examiner

200

RLC1

200

Logical channel 1

220

MAC

230

List of usable CGs
: CGindex=1, CGindex=3
Usable subcarrier spacings
: 15KHz, 30KHz
Usable cells
: Cell 1, Cell 2
Whether type 1 CG is usable
(ConfiguredGrantType1Allowed)
: True
Whether dynamic grant (DG) is usable
(DynamigGrantAllowed)
: True
Usable physical layer priority resource
: High

FIG. 3

METHOD AND APPARATUS FOR APPLYING LOGICAL CHANNEL LIMIT IN WIRELESS COMMUNICATION SYSTEM

PRIORITY

This application is a National Phase Entry of PCT International Application No. PCT/KR2020/015982, which was filed on Nov. 13, 2020, and claims priority to Korean Patent Application No. 10-2019-0147999, which was filed on Nov. 18, 2019, the entire content of each of which is incorporated herein by reference.

TECHNICAL FIELD

The disclosure relates to a method and apparatus for applying or changing logical channel restrictions in a wireless communication system.

BACKGROUND ART

To meet the ever increasing demand for wireless data traffic since the commercialization of 4G communication systems, efforts have been made to develop improved 5G or pre-5G communication systems. As such, 5G or pre-5G communication systems are also called "beyond 4G network system" or "post Long Term Evolution (LTE) system". To achieve high data rates, 5G communication systems are being considered for implementation in the extremely high frequency (mmWave) band (e.g., 60 GHz band). To decrease path loss of radio waves and increase the transmission distance in the mmWave band, various technologies including beamforming, massive multiple-input multiple-output (massive MIMO), full dimensional MIMO (FD-MIMO), array antennas, analog beamforming, and large scale antennas are considered for 5G communication systems. Also, to improve system networks in 5G communication systems, technology development is under way regarding evolved small cells, advanced small cells, cloud radio access networks (cloud RANs), ultra-dense networks, device-to-device (D2D) communication, wireless backhaul, moving networks, cooperative communication, coordinated multipoints (CoMP), interference cancellation, and the like. Additionally, advanced coding and modulation (ACM) schemes such as hybrid frequency shift keying and quadrature amplitude modulation (FQAM) and sliding window superposition coding (SWSC), and advanced access technologies such as filter bank multi carrier (FBMC), non-orthogonal multiple access (NOMA), and sparse code multiple access (SCMA) are also under development for 5G systems.

Meanwhile, the Internet is evolving from a human centered network where humans create and consume information into the Internet of Things (IoT) where distributed elements such as things exchange and process information. There has also emerged the Internet of Everything (IoE) technology that combines IoT technology with big data processing technology through connection with cloud servers. To realize IoT, technology elements related to sensing, wired/wireless communication and network infrastructure, service interfacing, and security are needed, and technologies interconnecting things such as sensor networks, machine-to-machine (M2M) or machine type communication (MTC) are under research in recent years. In IoT environments, it is possible to provide intelligent Internet technology services, which collect and analyze data created by interconnected things to add new values to human life.

Through convergence and combination between existing information technologies and various industries, IoT technology may be applied to various areas such as smart homes, smart buildings, smart cities, smart or connected cars, smart grids, health-care, smart consumer electronics, and advanced medical services.

Accordingly, various attempts are being made to apply 5G communication systems to IoT networks. For example, technologies such as sensor networks and machine-to-machine (M2M) or machine type communication (MTC) are being realized by use of 5G communication technologies including beamforming, MIMO, and array antennas. Application of cloud RANs as a big data processing technique described above may be an instance of convergence of 5G technology and IoT technology.

On the other hand, for transmitting data in a wireless communication system, each logical channel may have a restriction on usable radio resources. This is to transmit data only for a specific resource in consideration of quality of service (QoS) requirements of data processed in a logical channel. When such a logical channel restriction is configured, for including data in a new medium access control (MAC) protocol data unit (PDU), only logical channels allowed according to the configured logical channel restriction can participate in logical channel prioritization.

DISCLOSURE OF INVENTION

Technical Problem

An object of the disclosure is to provide a method and apparatus for changing logical channel restrictions when a BWP is configured for each cell and data transmission according to the logical channel restrictions is not configured on the active BWP

Solution to Problem

In the disclosure for solving the above problem, a method of a terminal in a wireless communication system may include: receiving, from a base station, configuration information for a logical channel; receiving, from the base station, control information for allocating an uplink transmission resource; identifying whether the allocated uplink transmission resource is a dynamic grant; identifying, in case that the allocated uplink transmission resource is a dynamic grant, whether a physical layer priority is indicated by the control information; selecting, in case that a physical layer priority is indicated, a logical channel including a value corresponding to the physical layer priority indicated by the control information based on the configuration information; and transmitting, to the base station, data for the selected logical channel using the allocated uplink transmission resource.

In addition, a terminal in a wireless communication system according to an embodiment of the disclosure may include: a transceiver; and a controller that is configured to: control the transceiver to receive, from a base station, configuration information for a logical channel; control the transceiver to receive, from the base station, control information for allocating an uplink transmission resource; identify whether the allocated uplink transmission resource is a dynamic grant; identify, in case that the allocated uplink transmission resource is a dynamic grant, whether a physical layer priority is indicated by the control information; select, in case that a physical layer priority is indicated, a logical channel including a value corresponding to the physical layer priority indicated by the control information based on the configuration information; and control the transceiver to transmit, to the base station, data for the selected logical channel using the allocated uplink transmission resource.

Advantageous Effects of Invention

According to one embodiment of the disclosure, even if data transmission according to a logical channel restriction is not configured on the active BWP, there is an effect that data can be transmitted using an allowed cell or configuration by changing the logical channel restriction.

BRIEF DESCRIPTION OF DRAWINGS

FIG. 3 is a diagram showing an example in which a logical channel restriction is actually applied.

MODE FOR THE INVENTION

Hereinafter, embodiments of the disclosure are described in detail with reference to the accompanying drawings. Descriptions of well-known functions and structures incorporated herein may be omitted to avoid obscuring the subject matter of the disclosure. The terms described below are defined in consideration of their functions in the disclosure, and these may vary depending on the intention of the user, the operator, or the custom. Hence, their meanings should be determined based on the overall contents of this specification.

Advantages and features of the disclosure and methods for achieving them will be apparent from the following detailed description of embodiments taken in conjunction with the accompanying drawings. However, the disclosure is not limited to the embodiments disclosed below but may be implemented in various different ways, the embodiments are provided only to complete the disclosure and to fully inform the scope of the disclosure to those skilled in the art to which the disclosure pertains, and the disclosure is defined only by the scope of the claims. The same reference symbols are used throughout the specification to refer to the same parts.

In the following description of the disclosure, if it is determined that a detailed description of a related well-known function or structure may unnecessarily obscure the gist of the disclosure, the detailed description thereof will be omitted. Next, embodiments of the disclosure will be described with reference to the accompanying drawings.

Figure 1:
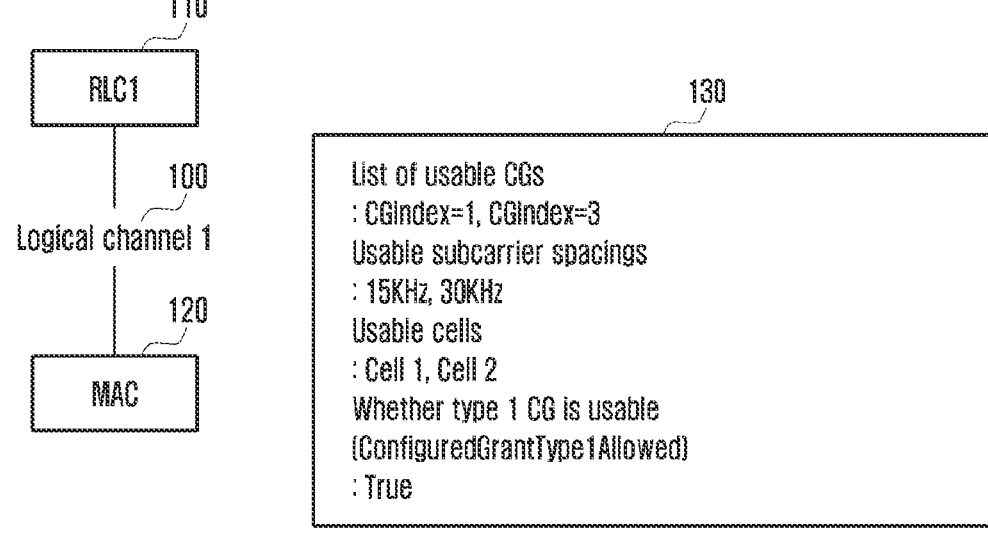
FIG. 1 is a diagram illustrating an example in which the terminal applies a logical channel restriction in a communication system.

FIG. 1 is a diagram illustrating an example in which the terminal applies a logical channel restriction in a communication system.

In a 5G communication system, a logical channel 100 means a path connecting an RLC entity 110 and a MAC entity 120, and one logical channel may correspond to one RLC entity. In uplink data transmission, each logical channel may have a restriction on available radio resources (130). This is to transmit data only for a specific resource in consideration of QoS requirements of data processed in a logical channel.

As a cell restriction on the logical channel, one or more of a list of usable configured grants (CGs), usable subcarrier spacings, usable cells, and whether a type 1 configured grant is usable (ConfiguredGrantType1Allowed) may be configured. In the embodiment of FIG. 1, it is assumed for logical channel 1 (100) that usable configured grants are CG indexes 1 and 3, usable subcarrier spacings for resources are 15 KHz and 30 KHz, usable cells are cell 1 and cell 2, and whether a type 1 configured grant is usable is configured to true.

In this case, the terminal may use the corresponding resource if all the configured cell restrictions are satisfied. The embodiment of FIG. 1 shows an example in which logical channel restrictions are applied; logical channels may have different logical channel configurations, and some logical channel configurations may be not configured. These logical channel restrictions can be operated so that the logical channel restrictions are applied when creating a new medium access control (MAC) protocol data unit (PDU), and only logical channels that can use the corresponding resources participate in logical channel prioritization to thereby include data in the corresponding MAC PDU.

Figure 2:
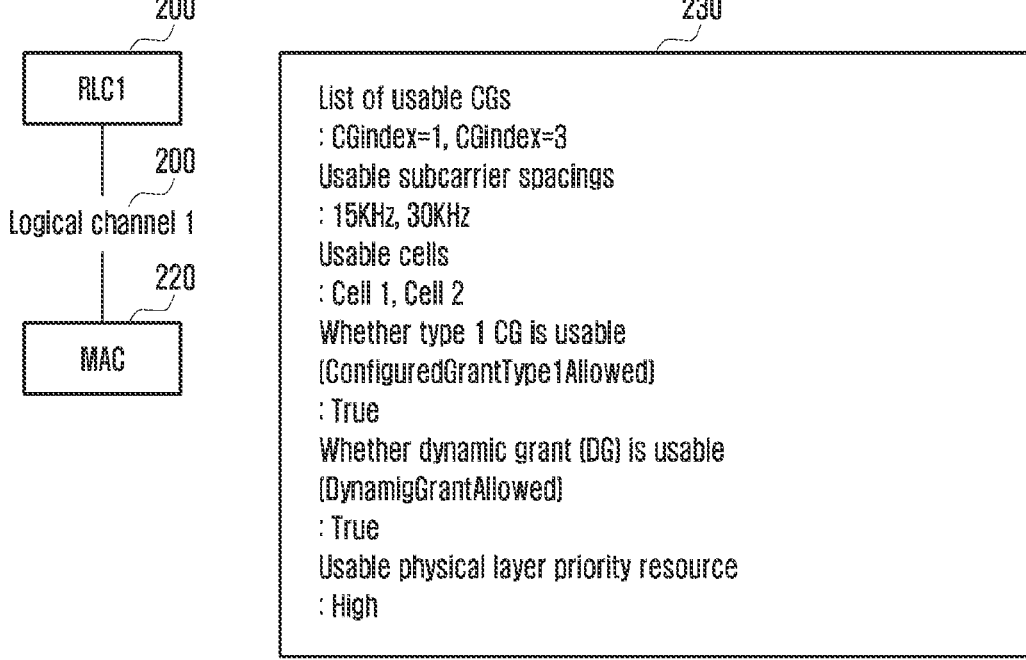
FIG. 2 is a diagram illustrating another example of applying a logical channel restriction in a communication system.

FIG. 2 is a diagram illustrating another example of applying a logical channel restriction in a communication system.

In a 5G communication system, a logical channel 200 means a path connecting an RLC entity 210 and a MAC entity 220, and one logical channel may correspond to one RLC entity. In uplink data transmission, each logical channel may have a restriction on available radio resources (130). This is to transmit data only for a specific resource in consideration of QoS requirements of data processed in a logical channel.

As a cell restriction on the logical channel, one or more of a list of usable configured grants (CGs), usable subcarrier spacings, usable cells, whether a type 1 configured grant is usable (ConfiguredGrantType1Allowed), whether a dynamic grant is usable (DynamicGrantAllowed), a list of usable DCI formats, and usable physical layer priority resources may be configured.

In the embodiment of FIG. 2, it is assumed for logical channel 1 (200) that usable configured grants are CG indexes 1 and 3, usable subcarrier spacings for resources are 15 KHz and 30 KHz, usable cells are cell 1 and cell 2, whether a type 1 configured grant is usable is set to true, whether a dynamic grant resource is usable is set to true, and a usable physical layer priority is set to high.

In this case, the terminal may use the corresponding resource if all the configured cell restrictions are satisfied. The embodiment of FIG. 2 shows an example in which logical channel restrictions are applied; logical channels may have different logical channel configurations, and some logical channel configurations may be not configured. These logical channel restrictions can be operated so that the logical channel restrictions are applied when creating a new medium access control (MAC) protocol data unit (PDU), and only logical channels that can use the corresponding resources participate in logical channel prioritization to thereby include data in the corresponding MAC PDU.

Among these, whether a dynamic grant is usable can be set with a 1-bit indicator; when the corresponding field is set, this means that the resource configured with the dynamic grant can be used. According to an embodiment, this may also be applied as whether a dynamic grant resource cannot be used. The physical layer priority resource means a separated physical layer priority when the physical layer priority is separated by values of a downlink control information (DCI) field or a group of specific DCI fields. For example, resources configured with DCI formats 1 and 2 may be applied as having a high physical layer priority, and resources configured with other DCI formats may be applied as having a low physical layer priority. In another embodiment, having a specific DCI field indicating high priority may indicate that it is a high-priority physical layer resource, and having a corresponding field indicating low priority or not having a corresponding field may indicate that it is a low-priority physical layer resource.

Figure 3:
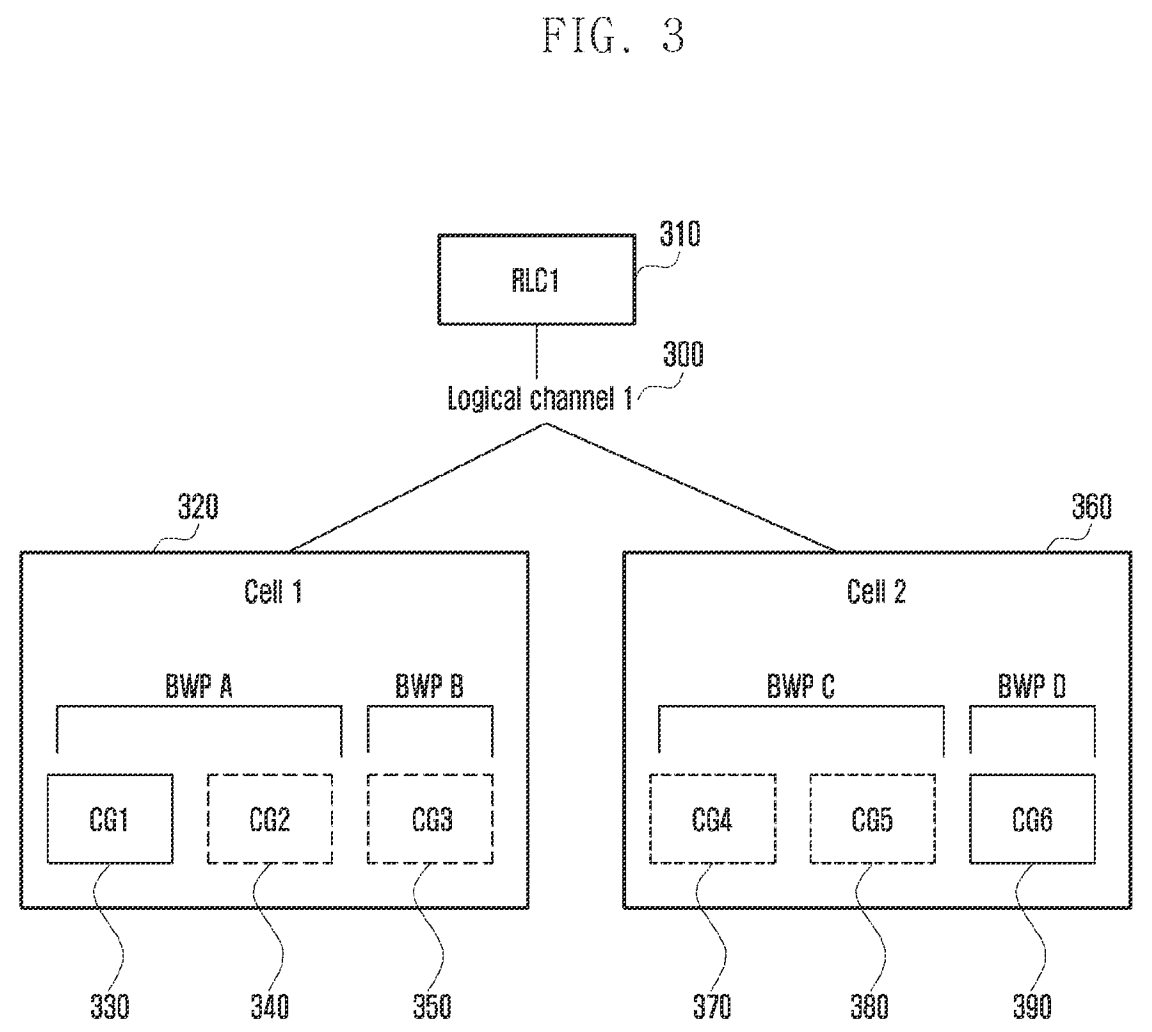

FIG. 3 is a diagram showing an example in which a logical channel restriction is actually applied.

The embodiment of FIG. 3 shows an example in which logical channel restrictions are applied to one logical channel, logical channel 1 (300). Each logical channel corresponds to an RLC entity, and the example of FIG. 3 indicates that logical channel 1 (300) corresponds to RLC 1 (310). And, cell 1 (320) and cell 2 (360) are configured as a list of usable cells for this logical channel.

It is assumed in cell 1 (320) that configured grant 1 (330) is configured on bandwidth part A (BWP A) and configured grant 2 (340) is configured on BWP B. It is assumed in cell 2 (360) that configured grant 4 (370) is configured on BWP C and configured grant 6 (390) is configured on BWP D.

Among these configured grants, the configured grant resources usable for logical channel 1 are configured grant 1 (330) and configured grant 6 (390) indicated by a solid line in FIG. 3. Other configured grant resources cannot be used even if resources are actually transmitted.

Only one active BWP may be used in one cell. In this case, there is only one active BWP although multiple BWPs are actually configured; if a configured grant being actually configured is not configured on the active BWP, this configured grant cannot be used for data transmission. In the example of FIG. 3, if BWP A and BWP D are inactive, logical channel 1 cannot transmit data with a configured grant because there is no configured grant that logical channel 1 can use.

Figure 4:
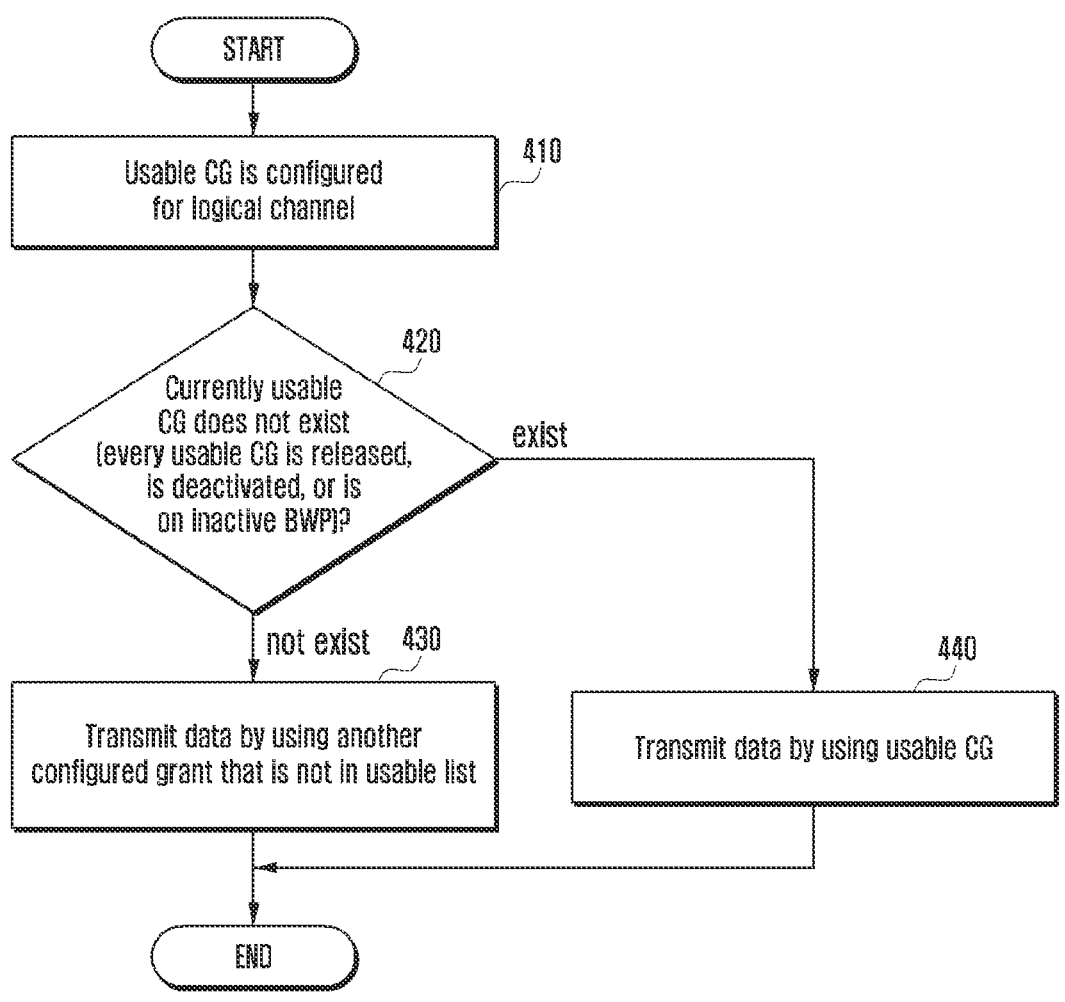
FIG. 4 is a diagram showing a method of changing a logical channel restriction proposed in the disclosure.

FIG. 4 illustrates a method of changing a logical channel restriction proposed in the disclosure.

As described in the example of FIG. 3, a usable configured grant may not exist due to deactivation of the BWP, deactivation of a cell, or the like. In this case, as there may be no radio resources that can be used by a logical channel, it is necessary to change the configured logical channel restriction. FIG. 4 shows an embodiment of a method for changing such a logical channel restriction.

When a usable configured grant is configured for a logical channel (410), the terminal may identify whether there is a configured grant usable for data transmission with respect to the logical channel restriction configured for each logical channel. If there is no currently usable configured grant, in other words, if every usable configured grant is released, is deactivated, or is configured on an inactive BWP (420), the corresponding logical channel may be unable to transmit using a configured grant in the usable list.

In this case, the corresponding logical channel may transmit data by using another configured grant that is not in the usable list (430). Otherwise, if there is a currently usable configured grant, data may be transmitted with the usable configured grant according to the existing configuration (440).

Figure 5:
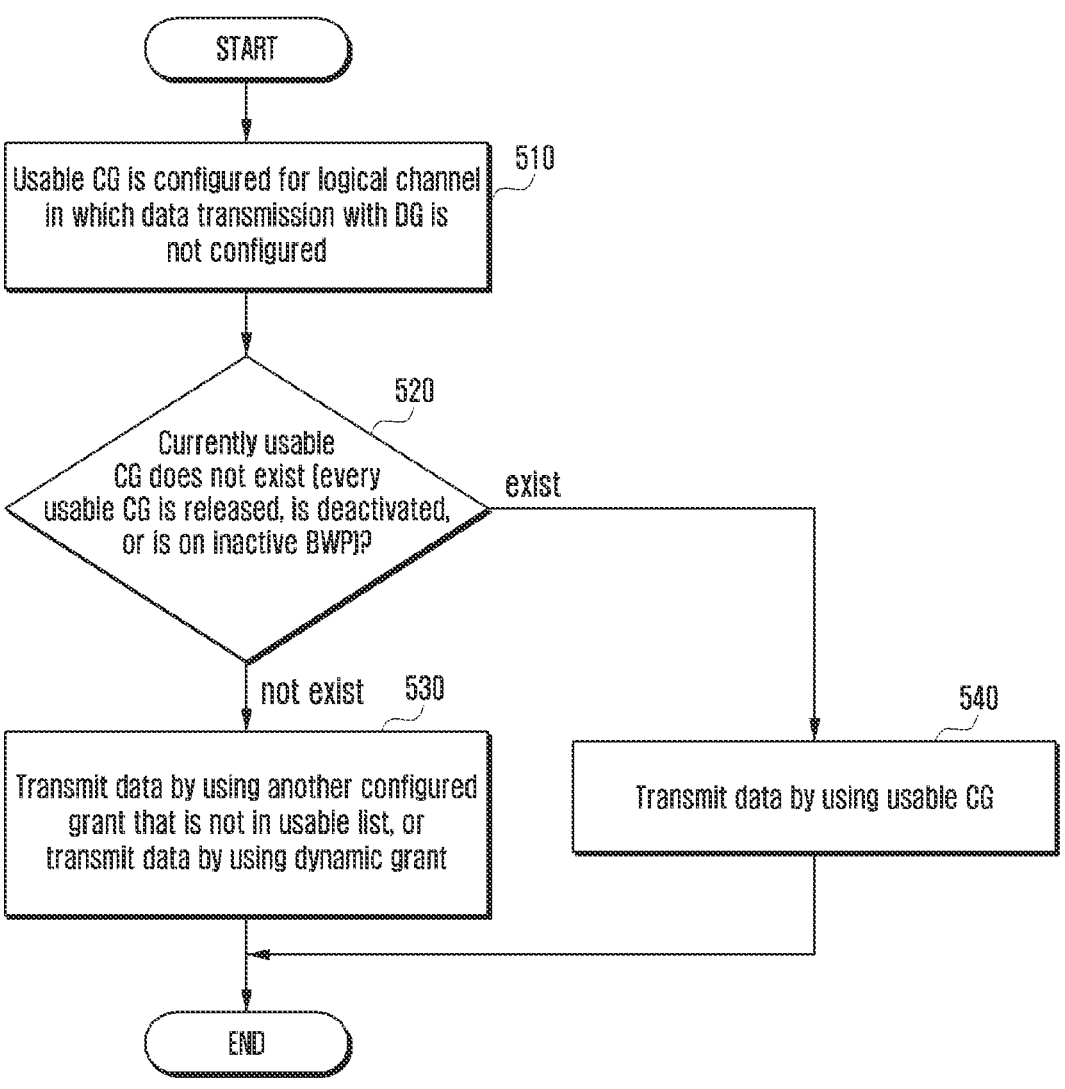
FIG. 5 is a diagram showing a method of changing a logical channel restriction proposed in the disclosure.

FIG. 5 illustrates a method of changing a logical channel restriction proposed in the disclosure.

As described in the example of FIG. 3, a usable configured grant may not exist due to deactivation of the BWP, deactivation of a cell, or the like. In this case, as there may be no radio resources that can be used by a logical channel, it is necessary to change the configured logical channel restriction. FIG. 5 shows an embodiment of a method for changing such a logical channel restriction.

When a usable configured grant is configured for a logical channel in which data transmission with a dynamic grant is not configured (not allowed) (510), the terminal may identify whether there is a configured grant usable for data transmission with respect to the logical channel restriction configured for each logical channel. If there is no currently usable configured grant, in other words, if every usable configured grant is released, is deactivated, or is configured on an inactive BWP (520), the corresponding logical channel may be unable to transmit using a configured grant in the usable list.

In this case, the corresponding logical channel may transmit data by using another configured grant that is not in the usable list. Or, data may be transmitted using a dynamic grant (530). Otherwise, if there is a currently usable configured grant, data may be transmitted with the usable configured grant according to the existing configuration (540).

Figure 6:
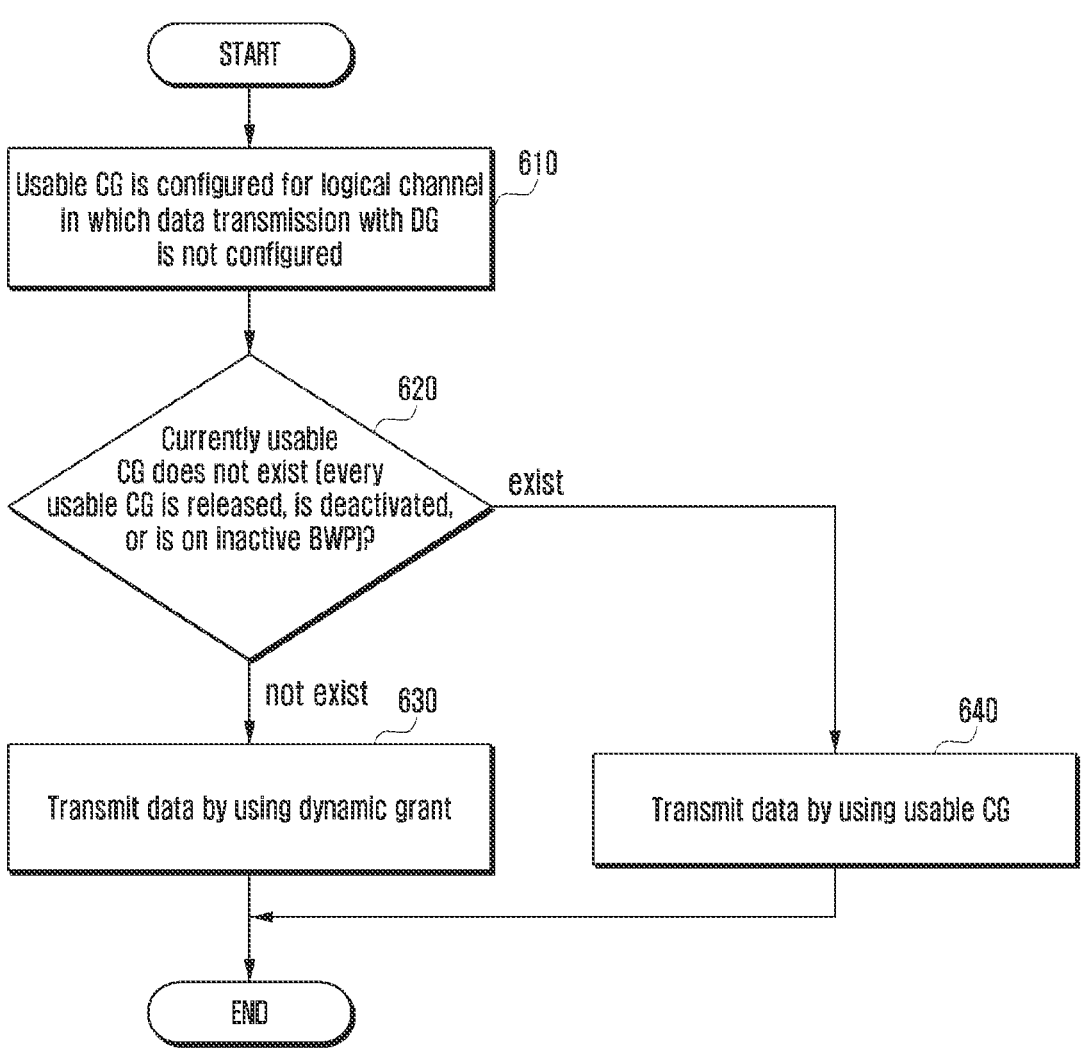
FIG. 6 is a diagram showing a method of changing a logical channel restriction proposed in the disclosure.

FIG. 6 illustrates a method of changing a logical channel restriction proposed in the disclosure.

As described in the example of FIG. 3, a usable configured grant may not exist due to deactivation of the BWP, deactivation of a cell, or the like. In this case, as there may be no radio resources that can be used by a logical channel, it is necessary to change the configured logical channel restriction. FIG. 6 shows an embodiment of a method for changing such a logical channel restriction.

When a usable configured grant is configured for a logical channel in which data transmission with a dynamic grant is not configured (not allowed) (610), the terminal may identify whether there is a configured grant usable for data transmission with respect to the logical channel restriction configured for each logical channel. If there is no currently usable configured grant, in other words, if every usable configured grant is released, is deactivated, or is configured on an inactive BWP (620), the corresponding logical channel may be unable to transmit using a configured grant in the usable list.

In this case, the corresponding logical channel may transmit data by using a dynamic grant (630). This is to enable the corresponding logical channel to temporarily use a dynamic grant because there is no more usable configured grant although the corresponding logical channel is not allowed to use a dynamic grant. Otherwise, if there is a currently usable configured grant, data may be transmitted with the usable configured grant according to the existing configuration (640).

Figure 7:
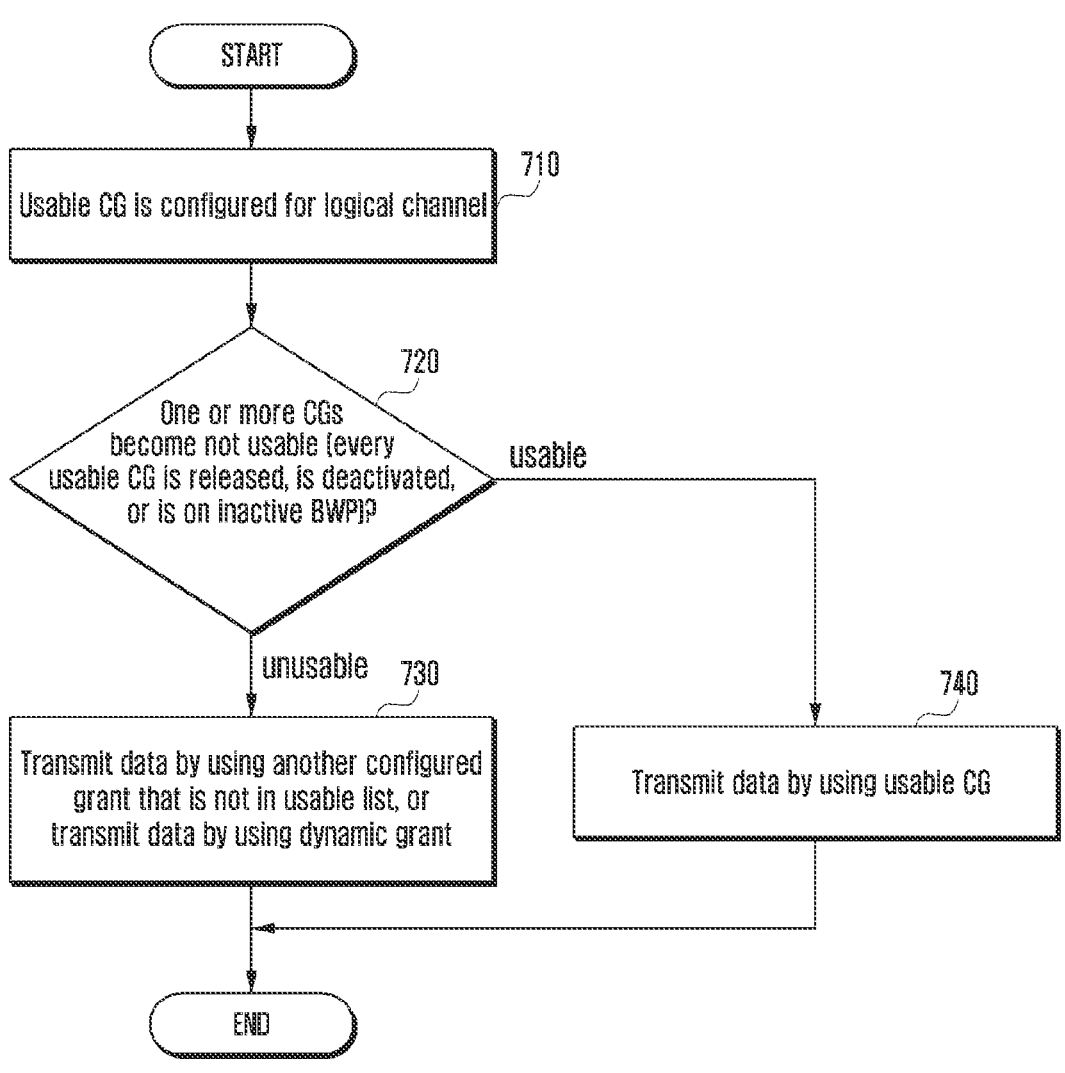
FIG. 7 is a diagram showing a method of changing a logical channel restriction proposed in the disclosure.

FIG. 7 illustrates a method of changing a logical channel restriction proposed in the disclosure.

As described in the example of FIG. 3, the usable configured grant may be changed due to deactivation of the BWP, deactivation of a cell, or the like. In this case, as radio resources usable by a logical channel may not exist or may be insufficient, it is necessary to change the configured logical channel restriction. FIG. 7 shows an embodiment of a method for changing such a logical channel restriction.

When a usable configured grant is configured for a logical channel (710), the terminal may identify whether a configured grant usable for data transmission is changed with respect to the logical channel restriction configured for each logical channel. If at least one configured grant among the usable configured grants becomes unusable, in other words, if at least one usable configured grant is released, is deactivated, or is not configured on the active BWP (720), the corresponding logical channel may be unable to transmit using a configured grant in the usable list or may fail to satisfy quality of service (QoS) requirements.

In this case, the corresponding logical channel may transmit data by using another configured grant that is not in the usable list (730). Otherwise, if all of the currently configured usable configured grants are usable, data may be transmitted with a usable configured grant according to the existing configuration (740).

Figure 8:
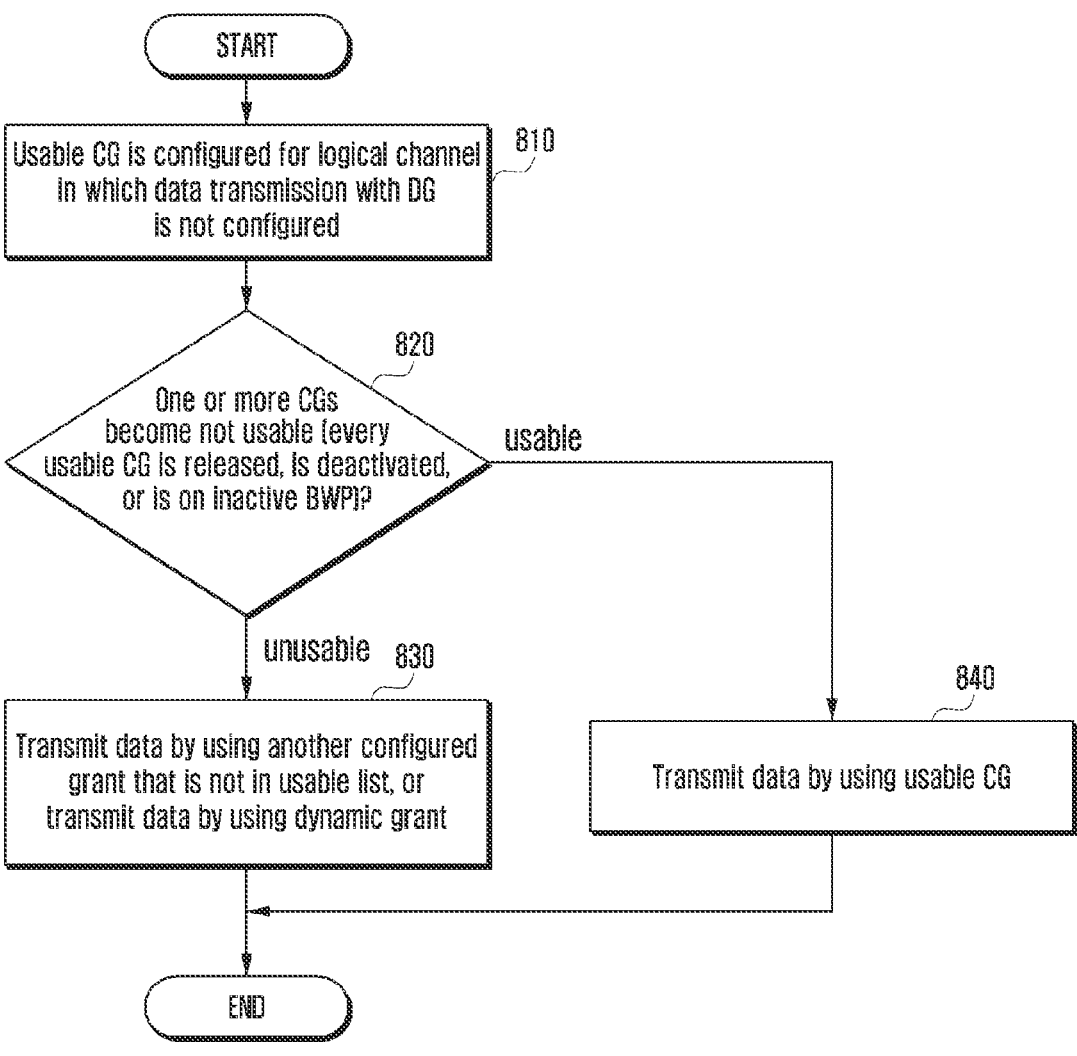
FIG. 8 is a diagram showing a method of changing a logical channel restriction proposed in the disclosure.

FIG. 8 illustrates a method of changing a logical channel restriction proposed in the disclosure.

As described in the example of FIG. 3, the usable configured grant may be changed due to deactivation of the BWP, deactivation of a cell, or the like. In this case, as radio resources usable by a logical channel may not exist or may be insufficient, it is necessary to change the configured logical channel restriction. FIG. 8 shows an embodiment of a method for changing such a logical channel restriction.

When a usable configured grant is configured for a logical channel in which data transmission with a dynamic grant is not configured (not allowed) (810), the terminal may identify whether a configured grant usable for data transmission is changed with respect to the logical channel restriction configured for each logical channel. If at least one configured grant among the usable configured grants becomes unusable, in other words, if at least one usable configured grant is released, is deactivated, or is not configured on the active BWP (820), the corresponding logical channel may be unable to transmit using a configured grant in the usable list or may fail to satisfy quality of service (QoS) requirements.

In this case, the corresponding logical channel may transmit data by using another configured grant that is not in the usable list, or may transmit data by using a dynamic grant (830). Otherwise, if all of the currently configured usable configured grants are usable, data may be transmitted with a usable configured grant according to the existing configuration (840).

Figure 9:
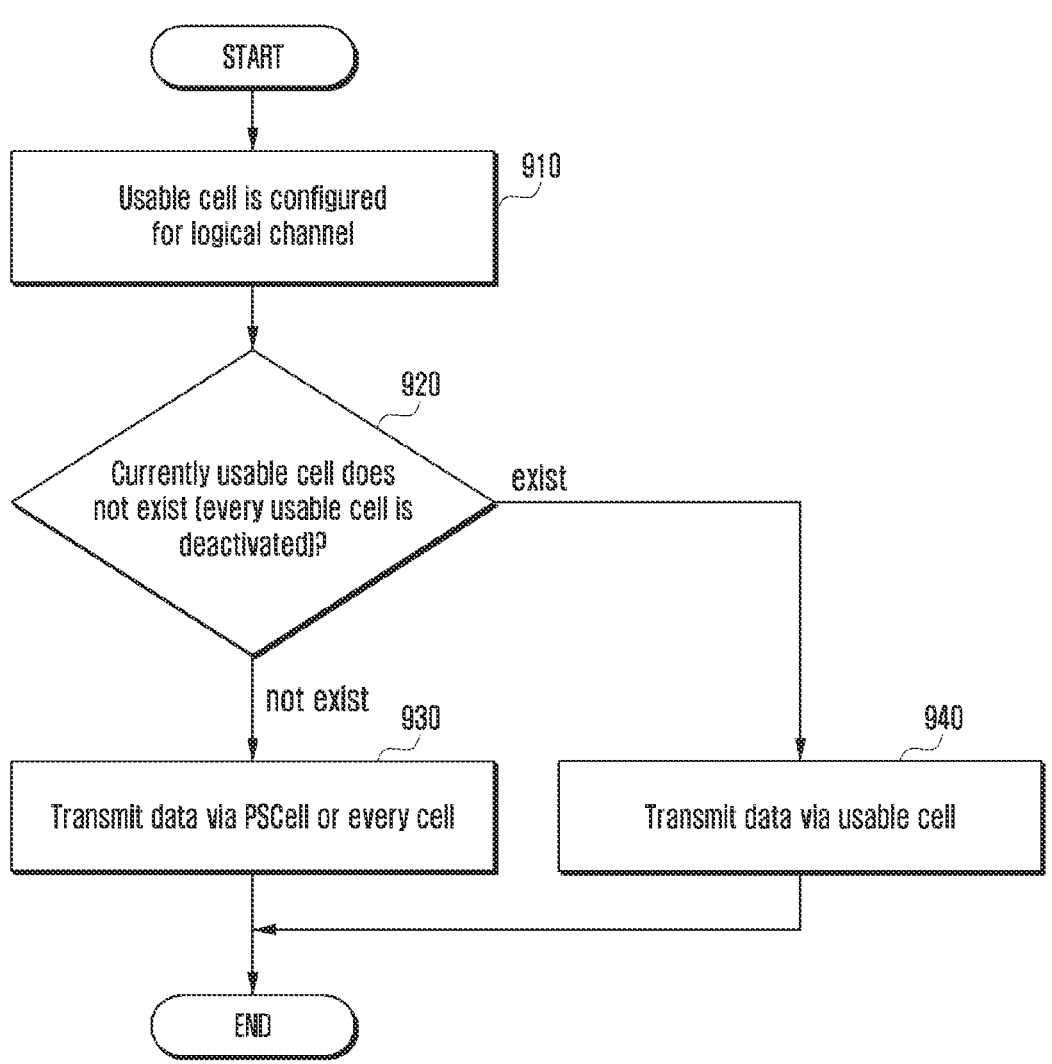
FIG. 9 is a diagram showing a method of changing a logical channel restriction proposed in the disclosure.

FIG. 9 illustrates a method of changing a logical channel restriction proposed in the disclosure.

As described in the example of FIG. 3, the usable configured grant may be changed due to deactivation of the BWP, deactivation of a cell, or the like. In this case, as radio resources usable by a logical channel may not exist or may be insufficient, it is necessary to change the configured logical channel restriction. FIG. 9 shows an embodiment of a method for changing such a logical channel restriction.

When a list of usable cells is configured for a logical channel (910), the terminal may identify whether there is a cell usable for data transmission with respect to the logical channel restriction configured for each logical channel. If there is no usable cell, in other words, if all usable cells are deactivated (920), the corresponding logical channel may be unable to transmit using a cell in the usable list.

In this case, the logical channel may transmit data by using a different cell that is not in the usable list. However, in a certain embodiment, the different cell may be the primary secondary cell (PSCell) or cells including the PSCell (930). As a more specific example, the different cell that is not in the usable list but is used for data transmission may be configured as a special cell (SPCell) including the PCell or PSCell. In another embodiment, as there is no usable cell, the corresponding RLC entity may be deactivated (RLC deactivation), and the PDCP entity may request discard of data in the corresponding RLC entity without sending any more data to be transmitted thereto. Otherwise, if a currently configured usable cell can be used, data may be transmitted via the usable cell according to the existing configuration (940).

Figure 10:
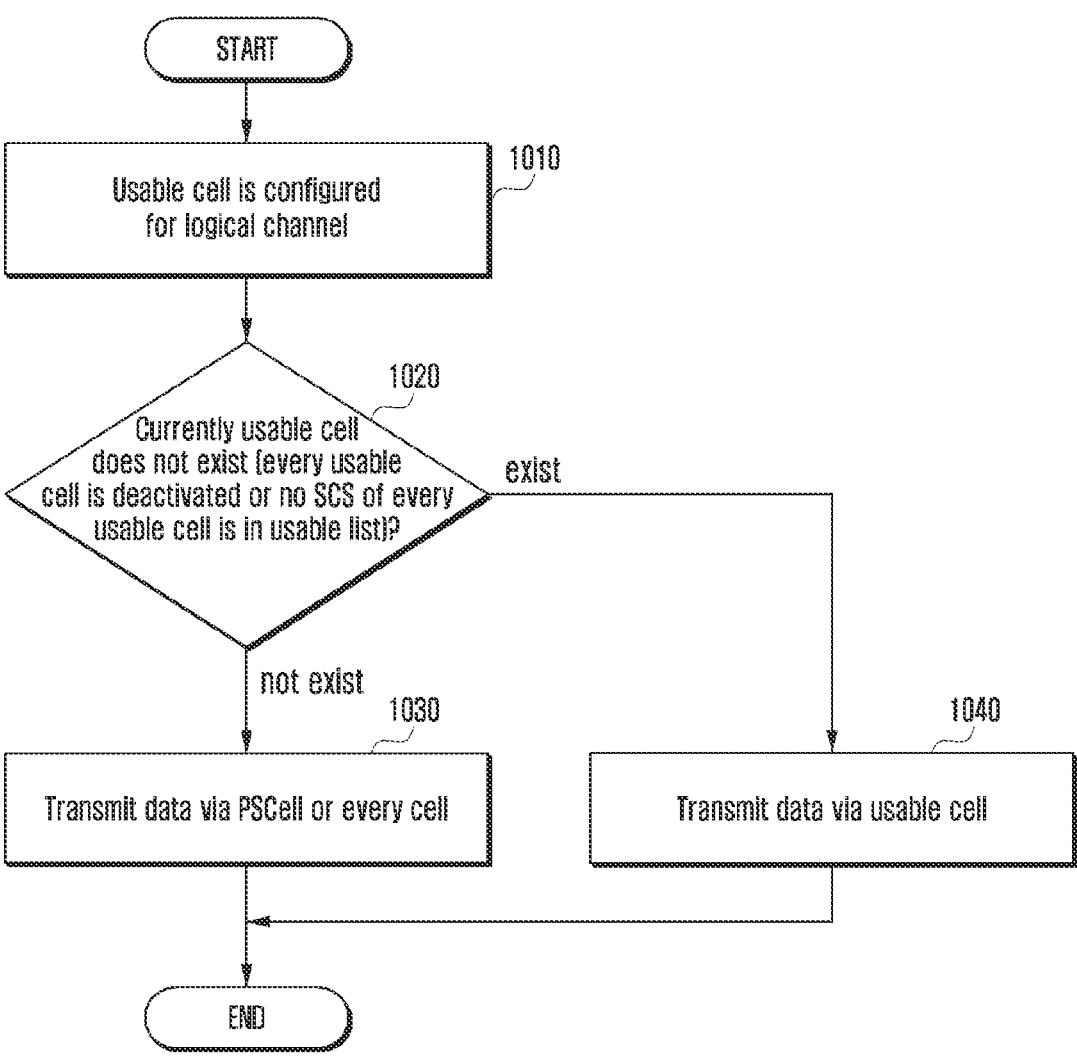
FIG. 10 is a diagram showing a method of changing a logical channel restriction proposed in the disclosure.

FIG. 10 illustrates a method of changing a logical channel restriction proposed in the disclosure.

As described in the example of FIG. 3, the usable configured grant may be changed due to deactivation of the BWP, deactivation of a cell, or the like. In this case, as radio resources usable by a logical channel may not exist or may be insufficient, it is necessary to change the configured logical channel restriction. FIG. 10 shows an embodiment of a method for changing such a logical channel restriction.

When a list of usable cells is configured for a logical channel (1010), the terminal may identify whether there is a cell usable for data transmission with respect to the logical channel restriction configured for each logical channel. If there is no usable cell, in other words, if all usable cells are deactivated or no subcarrier spacings (SCS) of all usable cells are in the usable list (1020), the corresponding logical channel may be unable to transmit using a cell in the usable list.

In this case, the logical channel may transmit data by using a different cell that is not in the usable list. However, in a certain embodiment, the different cell may be the PSCell or cells including the PSCell (1030). As a more specific example, the different cell that is not in the usable list but is used for data transmission may be configured as a special cell (SPCell) including the PCell or PSCell. In another embodiment, as there is no usable cell, the corresponding RLC entity may be deactivated (RLC deactivation), and the PDCP entity may request discard of data in the corresponding RLC entity without sending any more data to be transmitted thereto. Otherwise, if a currently configured usable cell can be used, data may be transmitted via the usable cell according to the existing configuration (1040).

Figure 11:
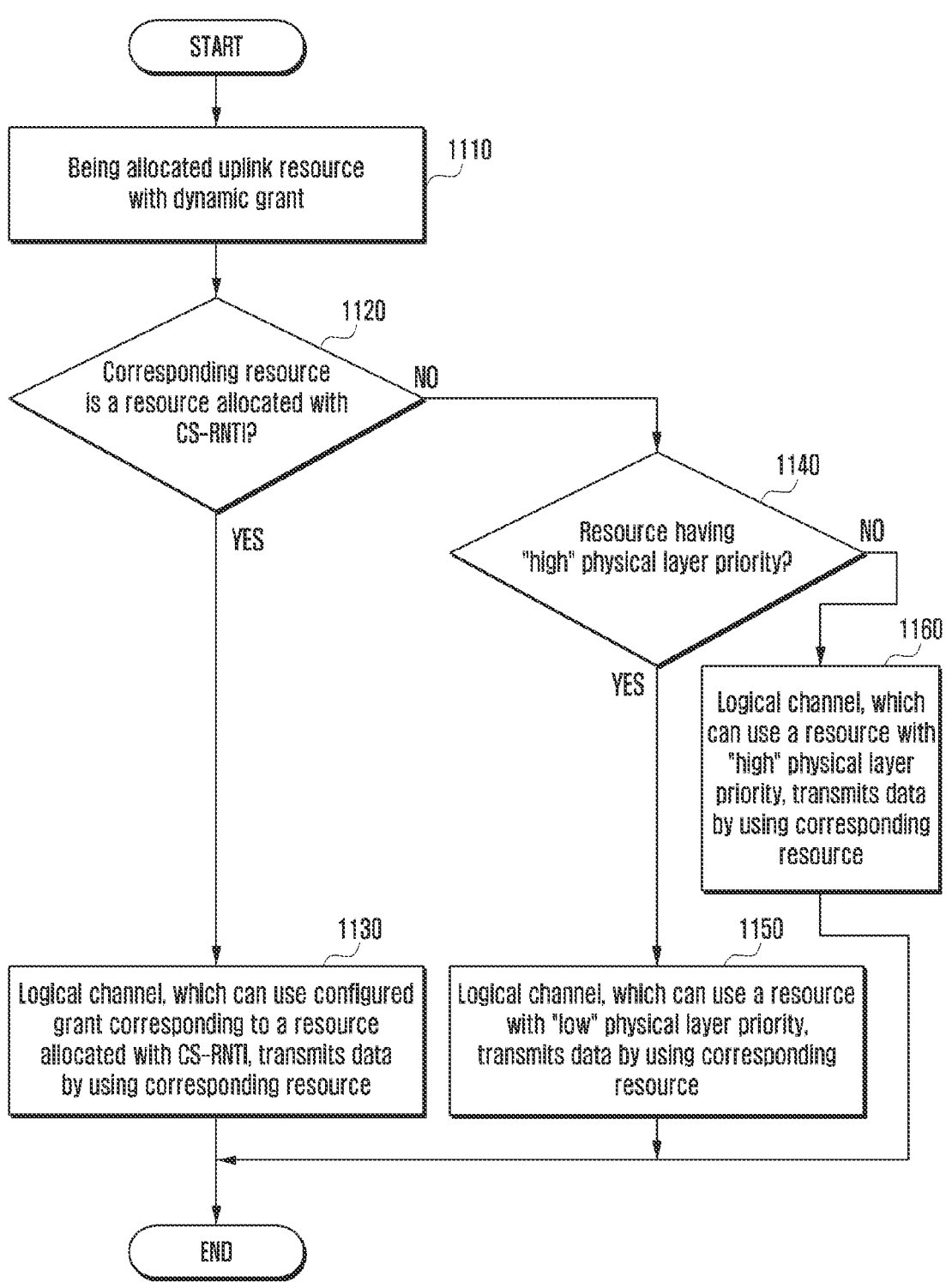
FIG. 11 is a diagram illustrating a method of applying a logical channel restriction based on a physical layer priority.

FIG. 11 illustrates a method of applying a logical channel restriction based on a physical layer priority.

The physical layer priority is a value defined to be used for prioritization or multiplexing in the physical layer with respect to corresponding radio resources. Here, if the physical layer priority of a corresponding resource is high, there is a need to include data that must be processed first. To this end, logical channel restrictions can be configured to take this physical layer priority into account. Such logical channel restrictions may have the following selection conditions.

Logical channel that can use only a high physical layer priority resource

Logical channel that can use only a low physical layer priority resource

Logical channel that can use both a high physical layer priority resource and a low physical layer priority resource Logical channel that can use neither a high physical layer priority resource nor a low physical layer priority resource According to embodiments, this logical channel restriction on the physical layer priority may be applied only to resources allocated with a dynamic grant and may be not applied to resources allocated with a configured grant. In another embodiment, this logical channel restriction on the physical layer priority may be not applied to resources allocated with configured scheduling-radio network temporary identifier (CS-RNTI) indicating configured grant retransmission or activation.

When the terminal is allocated an uplink resource with a dynamic grant (1110), it may identify whether the corresponding resource is a resource allocated with CS-RNTI in order to apply the logical channel restriction (1120). If the corresponding resource is an uplink radio resource allocated with CS-RNTI, this means that it is a resource for configured grant retransmission or the first resource after configured grant activation. For this resource allocated with CS-RNTI, data may be transmitted using the corresponding resource via a logical channel that can use a configured grant corresponding to the allocated resource (1130). Further, the logical channel restriction on the physical layer priority may be not applied to this resource.

And, if the allocated resource is not a resource allocated with CS-RNTI (1120), this may be a radio resource allocated with cell-RNTI (C-RNTI) or modulation coding scheme-C-RNTI (MCS-C-RNTI). However, according to embodiments, the case of allocating radio resources with other RNTIs is not excluded. Then, the terminal may identify whether the physical layer priority of the allocated resource is indicated by a high priority value (1140). Here, if the allocated resource is a resource having a high physical layer priority, data may be transmitted using the corresponding resource via a logical channel that can use a high physical layer priority resource (1150). In other words, logical channels, which can use only a resource having a high physical layer priority set therein or can use both a high physical layer priority resource and a low physical layer priority resource, may use the corresponding resource.

Otherwise, if the allocated resource is a low physical layer priority resource or a resource for which the physical layer priority is not specified, a logical channel that can use a low physical layer priority resource may transmit data by using the corresponding resource (1160). In other words, logical channels, which can use only a low physical layer priority resource or can use both a high physical layer priority resource and a low physical layer priority resource, may use the corresponding resource.

Figure 12:
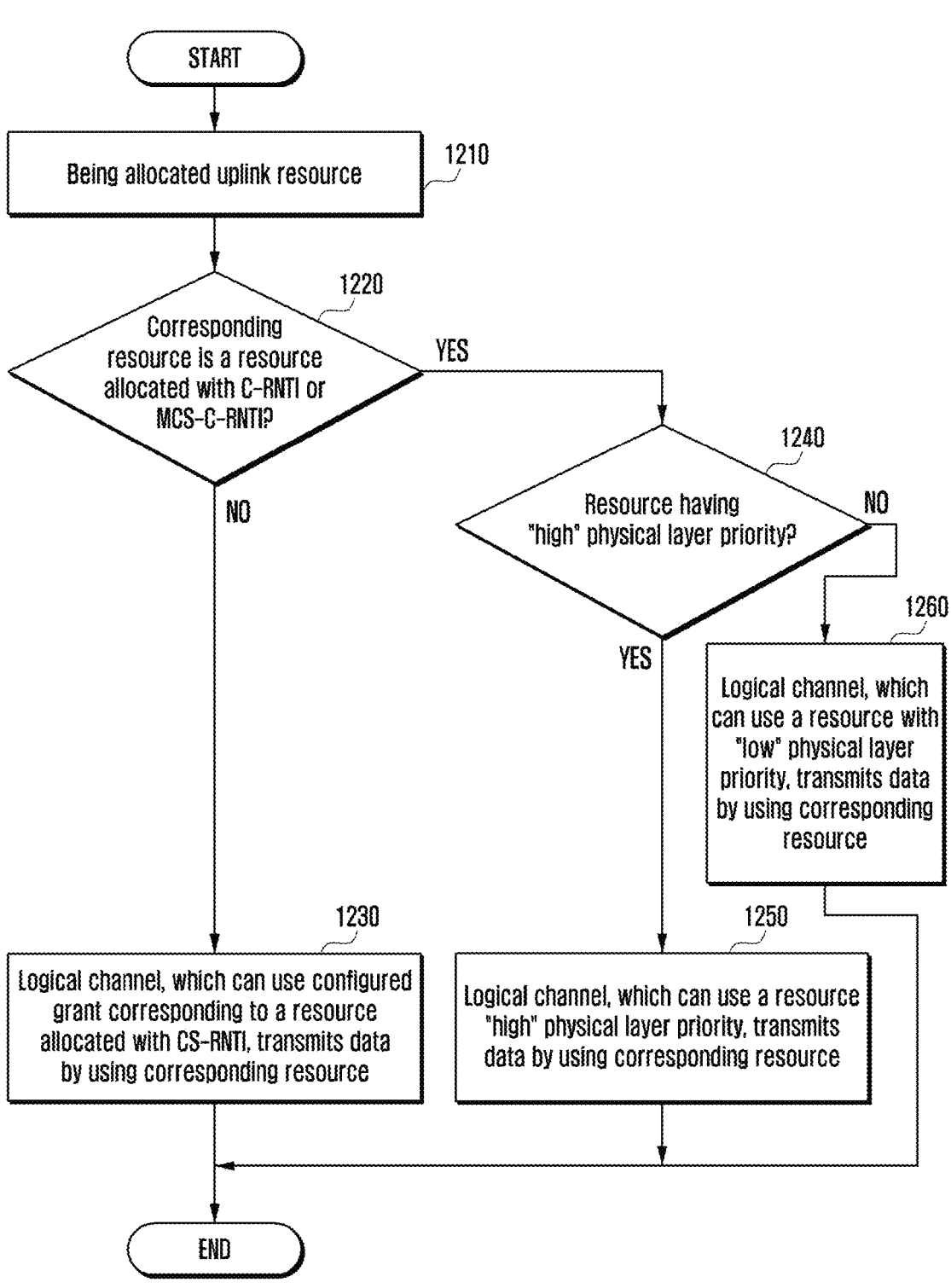
FIG. 12 is a diagram illustrating a method of applying a logical channel restriction based on a physical layer priority.

FIG. 12 illustrates a method of applying a logical channel restriction based on a physical layer priority.

The physical layer priority is a value defined to be used for prioritization or multiplexing in the physical layer with respect to corresponding radio resources. Here, if the physical layer priority of a corresponding resource is high, there is a need to include data that must be processed first. To this end, logical channel restrictions can be configured to take this physical layer priority into account. Such logical channel restrictions may have the following selection conditions.

Logical channel that can use only a high physical layer priority resource

Logical channel that can use only a low physical layer priority resource

Logical channel that can use both a high physical layer priority resource and a low physical layer priority resource Logical channel that can use neither a high physical layer priority resource nor a low physical layer priority resource According to embodiments, this logical channel restriction on the physical layer priority may be applied only to resources allocated with a dynamic grant and may be not applied to resources allocated with a configured grant. In another embodiment, this logical channel restriction on the physical layer priority may be not applied to resources allocated with CS-RNTI indicating configured grant retransmission or activation. In another embodiment, this logical channel restriction on the physical layer priority may be applied only to dynamic grant resources allocated with specific RNTI such as C-RNTI or MCS-C-RNTI.

When the terminal is allocated an uplink resource with a dynamic grant (1210), it may identify whether the corresponding resource is a resource allocated with C-RNTI or MCS-C-RNTI in order to apply the logical channel restriction (1220). If the corresponding resource is not a radio resource allocated with C-RNTI or MCS-C-RNTI, this may be a resource for configured grant retransmission or the first resource after configured grant activation. For the resource allocated with CS-RNTI, data may be transmitted using the corresponding resource via a logical channel that can use a configured grant corresponding to the allocated resource (1230). Further, the logical channel restriction on the physical layer priority may be not applied to this resource.

And, if the allocated resource is a resource allocated with C-RNTI or MCS-C-RNTI, the physical layer priority of the allocated resource may be identified. For example, the terminal may identify whether the physical layer priority of the allocated resource is indicated by a high priority value (1240). If being a resource having a high physical layer priority, data may be transmitted using the corresponding resource via a logical channel that can use a high physical layer priority resource (1250). In other words, logical channels, which can use only a resource having a high physical layer priority set therein or can use both a high physical layer priority resource and a low physical layer priority resource, may use the corresponding resource.

Otherwise, if being a low physical layer priority resource or a resource for which the physical layer priority is not specified, a logical channel that can use a low physical layer priority resource may transmit data by using the corresponding resource (1260). In other words, logical channels, which can use only a low physical layer priority resource or can use both a high physical layer priority resource and a low physical layer priority resource, may use the corresponding resource.

Figure 13:
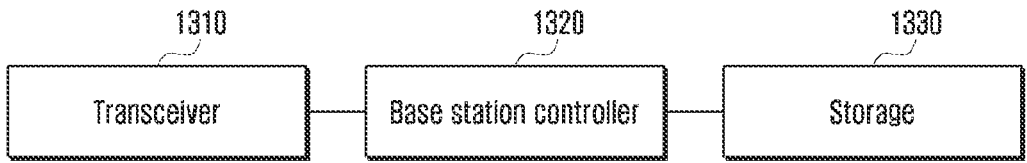
FIG. 13 is a diagram showing the structure of a base station according to an embodiment of the disclosure.

FIG. 13 is a diagram showing the structure of a base station according to an embodiment of the disclosure.

With reference to FIG. 13, the base station may include a transceiver 1310, a controller 1320, and a storage 1330. In the disclosure, the controller 1320 may be defined as a circuit, an application-specific integrated circuit, or at least one processor.

The transceiver 1310 may transmit and receive signals to and from other network entities. The transceiver 1310 may transmit system information to, for example, a terminal, and may transmit a synchronization signal or a reference signal.

Further, the transceiver 1310 according to an embodiment of the disclosure may transmit and receive data according to logical channel restrictions.

The controller 1320 may control the overall operation of the base station according to the embodiments proposed in the disclosure. For example, the controller 1320 may control signal flows between blocks to perform operations according to the flowcharts described above. Further, the controller 1320 according to an embodiment of the disclosure may change logical channel restrictions and control the transceiver 1310 to transmit and receive data correspondingly.

The storage 1330 may store at least one of information transmitted and received through the transceiver 1310 or information generated through the controller 1320.

Figure 14:
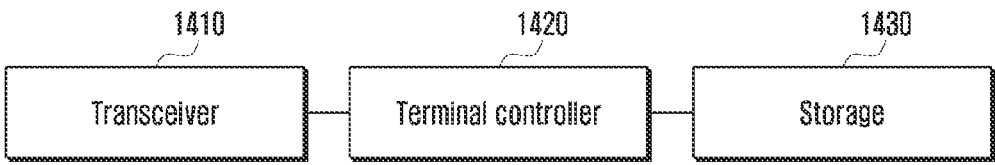
FIG. 14 is a diagram showing the structure of a terminal according to an embodiment of the disclosure.

FIG. 14 is a diagram showing the structure of a terminal according to an embodiment of the disclosure.

With reference to FIG. 14, the terminal may include a transceiver 1410, a controller 1420, and a storage 1430. In the disclosure, the controller may be defined as a circuit, an application-specific integrated circuit, or at least one processor.

The transceiver 1410 may transmit and receive signals to and from other network entities. The transceiver 1410 may receive system information from, for example, a base station, and may receive a synchronization signal or a reference signal. Further, the transceiver 1410 according to an embodiment of the disclosure may transmit and receive data according to logical channel restrictions.

The controller 1420 may control the overall operation of the terminal according to the embodiments proposed in the disclosure. For example, the controller 1420 may control signal flows between blocks to perform operations according to the flowcharts described above. Further, the controller 1420 according to an embodiment of the disclosure may change logical channel restrictions and control the transceiver 1410 to transmit and receive data correspondingly.

The storage 1430 may store at least one of information transmitted and received through the transceiver 1410 or information generated through the controller 1420.

Those of ordinary skill in the art to which the disclosure pertains will understand that the disclosure may be carried out in other specific forms without a change in the technical spirit or essential characteristics thereof. Therefore, it should be understood that the embodiments described above are illustrative in all respects and not restrictive. The scope of the disclosure is indicated by the following claims rather than the above detailed description, and all changes or modifications derived from the meaning and scope of the claims and their equivalents should be construed as being included in the scope of the present disclosure.

Meanwhile, preferred embodiments of the disclosure have been disclosed in the present specification and drawings. Although specific terms have been used, they are used in a general sense to easily describe the technical contents of the disclosure and help the understanding of the disclosure, and are not intended to limit the scope of the disclosure. It will be apparent to those of ordinary skill in the art to which the disclosure pertains that not only the embodiments disclosed herein but also other modifications based on the technical spirit of the disclosure can be carried out.

The invention claimed is:

1. A method performed by a terminal in a wireless communication system, the method comprising:
receiving, from a base station, configuration information on logical channels, wherein a priority value for a physical layer of a logical channel is set to a high priority value or a low priority value in the configuration information;

receiving, from the base station, downlink control information (DCI) indicating an uplink transmission resource;

identifying whether the uplink transmission resource is allocated as a dynamic grant;

in case that the uplink transmission resource is allocated as the dynamic grant:
identifying whether the DCI includes an information field indicating a physical layer(PHY) priority value associated with the dynamic grant, wherein the PHY priority value is the high priority value or the low priority value,
in case that the DCI includes the information field, selecting a first logical channel for which a priority value set in the configuration information is equal to the PHY priority value among the logical channels,
in case that the DCI does not include the information field, selecting a second logical channel for which the low priority value is set by the configuration information among the logical channels, and
transmitting, to the base station, data from the selected logical channel using the uplink transmission resource;

in case that the uplink transmission resource is allocated as a configured grant, selecting a third logical channel allowed to use the configured grant among the logical channels, based on the configuration information; and in case that the uplink transmission resource is not available, transmitting, to the base station, data from the third logical channel using another uplink transmission resource corresponding to another configured grant, wherein the third logical channel is not allowed to use the another configured grant based on the configuration information.

2. The method of claim 1,
wherein the uplink transmission resource is identified as the dynamic grant, in case that the DCI is generated based on a cell-radio network temporary identifier (C-RNTI) or a modulation coding scheme-C-RNTI (MCS-C-RNTI).

3. The method of claim 1,
wherein the uplink transmission resource is identified as the configured grant, in case that the DCI is generated based on a configured scheduling-radio network temporary identifier (CS-RNTI).

4. The method of claim 1,
wherein the uplink transmission resource is not available, in case that a configuration for the configured grant is released, deactivated, or a bandwidth part associated with the configured grant is deactivated.

5. A terminal in a wireless communication system, the terminal comprising:
a transceiver; and
a controller configured to:
control the transceiver to receive, from a base station, configuration information on logical channels, wherein a priority value for a physical layer of a logical channel is set to a high priority value or a low priority value in the configuration information,
control the transceiver to receive, from the base station, downlink control information (DCI) for indicating an uplink transmission resource, and
identify whether the uplink transmission resource is allocated as a dynamic grant, wherein, in case that the uplink transmission resource is allocated as the dynamic grant, the controller is further configured to:

identify whether the DCI includes an information field indicating a physical layer (PHY) priority value associated with the dynamic grant, wherein the PHY priority value is the high priority value or the low priority value, in case that the DCI includes the information field, select a first logical channel for which a priority value set in the configuration information is equal to the PHY priority value among the logical channels, in case that the DCI does not include the information field, select a second logical channel for which the low priority value is set by the configuration information among the logical channels, and control the transceiver to transmit, to the base station, data from the selected logical channel using the uplink transmission resource, wherein, in case that the uplink transmission resource is allocated as a configured grant, the controller is further configured to select a third logical channel allowed to use the configured grant among the logical channels, based on the configuration information, and wherein in case that the uplink transmission resource is not available, control the transceiver to transmit, to the base station, data from the third logical channel using another uplink transmission resource corresponding to another configured grant, the third logical channel being not allowed to use the another configured grant based on the configuration information.

6. The terminal of claim 5, wherein the uplink transmission resource is identified as the dynamic grant, in case that the DCI is generated based on a cell-radio network temporary identifier (C-RNTI) or a modulation coding scheme-C-RNTI (MCS-C-RNTI).

7. The terminal of claim 5, wherein the uplink transmission resource is identified as the configured grant, in case that the DCI is generated based on a configured scheduling-radio network temporary identifier (CS-RNTI).

8. The terminal of claim 5, wherein the uplink transmission resource is not available, in case that a configuration for the configured grant is released, deactivated, or bandwidth part associated with the configured grant is deactivated.

* * * * *